United States Patent [19]

Leinaar

[11] 4,132,336
[45] Jan. 2, 1979

[54] TIRE MOUNTED SUPPORT BRACKET FOR VEHICLE ACCESSORIES

[75] Inventor: Dennis J. Leinaar, Boulder, Colo.

[73] Assignee: Raaniel Industries, Inc., Boulder, Colo.

[21] Appl. No.: 759,010

[22] Filed: Jan. 13, 1977

[51] Int. Cl.$^2$ .............................................. B60R 9/06
[52] U.S. Cl. ......................... 224/42.13; 224/42.42 R; 224/42.45 R; 211/23; 248/231; 248/205 R
[58] Field of Search .............. 224/42.11, 42.12, 42.14, 224/42.15, 42.18, 42.19, 42.46 R, 42.45 R, 42.42 R, 29 R, 42.13, 42.16, 42.3, 42.26; 211/23, 24, 86, 71, 72, 74; 248/231, 503, 311.1, 313, 205 R; 296/37.2, 37.3

[56] References Cited

U.S. PATENT DOCUMENTS

| | | | |
|---|---|---|---|
| 1,421,050 | 6/1922 | Washington | 224/42.13 |
| 1,653,083 | 12/1927 | Blaw | 248/231 |
| 1,746,572 | 2/1930 | Wiseley | 224/42.45 R X |
| 1,798,239 | 3/1931 | Welker et al. | 224/42.13 X |
| 1,917,192 | 7/1933 | Hueber | 248/231 |
| 3,145,847 | 8/1964 | Clement | 211/71 |
| 3,188,034 | 6/1965 | Jackson | 224/42.45 R X |
| 3,685,201 | 4/1972 | Williams et al. | 224/42.13 X |
| 3,972,457 | 8/1976 | Kesler | 224/42.13 X |

Primary Examiner—Trygve M. Blix
Assistant Examiner—Jerold M. Forsberg
Attorney, Agent, or Firm—Sheridan, Ross, Fields & McIntosh

[57] ABSTRACT

A tire mounted support device for vehicle accessories includes an arcuate member extendible around the periphery of a spare tire mounted on the exterior of a vehicle and includes brackets on the sides thereof for supporting the accessories.

8 Claims, 4 Drawing Figures

U.S. Patent
Jan. 2, 1979
4,132,336
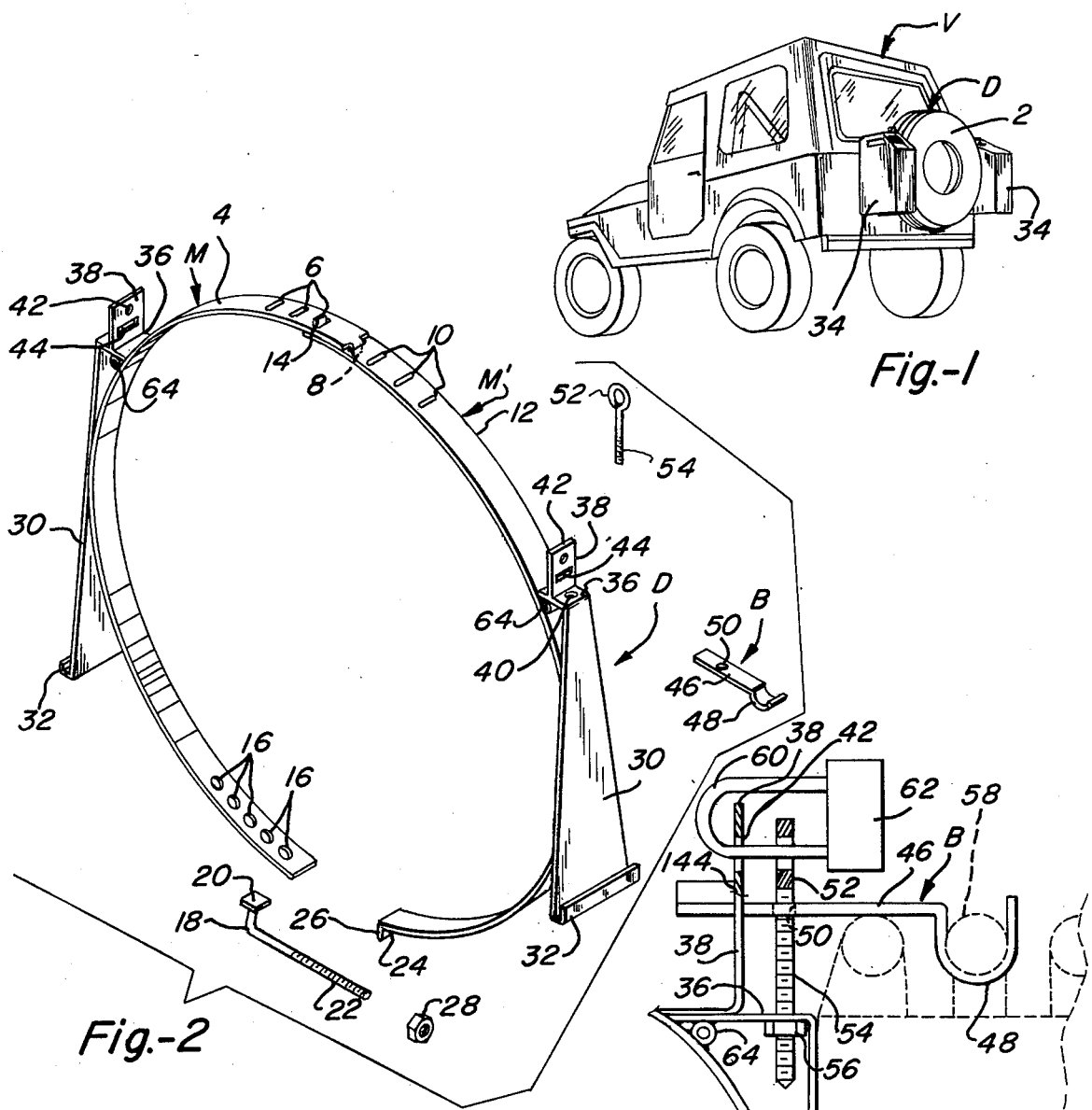
Fig.-1
Fig.-2
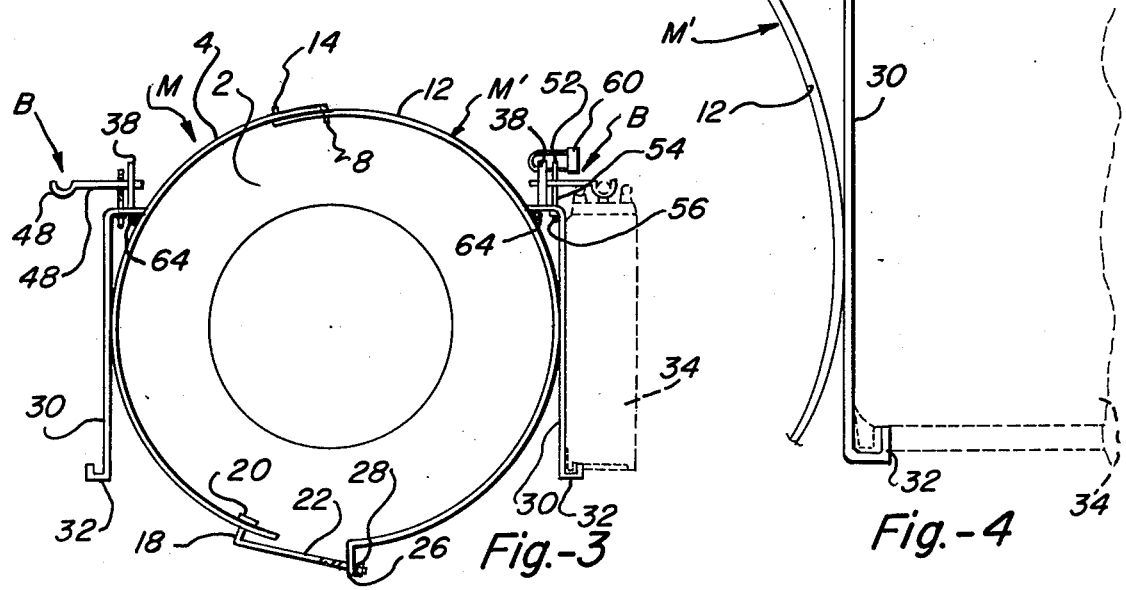
Fig.-3
Fig.-4

TIRE MOUNTED SUPPORT BRACKET FOR VEHICLE ACCESSORIES

BACKGROUND OF THE INVENTION

1. Field of the Invention

This invention relates to a tire mounted support device, more particularly to a device for mounting around the periphery of the spare tire on a recreational vehicle for securely attaching one or more accessories.

2. Description of the Prior Art

In the early days of the automobile, spare tires were generally mounted on the rear of the vehicle and some times served as a support for such things as an arcuate-shaped gas tank which hung by straps over the tire, such as that shown in U.S. Pat. No. 1,421,050 to Washington. Gas cans have been similarly supported, as shown in U.S. Pat. No. 2,951,671 to Roehrig. Also, various types of luggage carriers have been supported rearwardly of the spare tire and are mounted on the tire by hangers, as shown in U.S. Pat. No. 1,798,239 to Welker, et al.

A disadvantage with these earlier devices is that they were often not securely attached to the vehicle tire and therefore they could rattle or slip around. Also, when they were mounted rearwardly of the tire they took up excessive room, often extending beyond the rear bumper and were unsightly in appearance. Furthermore, due to extending beyond the rear bumper the article being supported was subject to being struck by another vehicle or damaged due to backing of the vehicle on which they were attached.

SUMMARY OF THE INVENTION

In accordance with this invention, a tire mounted support device for vehicle accessories is provided for mounting so as to clamp around the periphery of a tire on a recreational vehicle. Such a device includes an arcuate member extending around the periphery of a spare tire mounted on the exterior of the vehicle and has attaching means interconnecting the ends of the arcuate member for drawing them toward each other to draw the inner surface of the arcuate member into gripping engagement with the periphery of the tire. Also included are bracket means on the arcuate member for attaching the vehicle accessories.

More particularly, the device includes a pair of arcuate bands extendible around the periphery of the spare tire, each band having first and second ends wherein the first ends of the band are interconnected in overlapping position which is adjustable through a series of slots which cooperate with end flanges. A series of holes are spaced longitudinally along the second end of one of the bands and a flange extends substantially at right angles from the second end of the other of the bands and has a hole therethrough. A bolt having a right angle bend adjacent one end which has a flat head thereon, and the other end is threaded and is positionable through one of the series of holes with the flat head between the inner surface of the second end of the strap and the tire, when mounted on a tire, and the other end of the bolt extends through the hole in the flange and is secured by means of a threaded nut to apply tension to the bands. A long planar leg is attached to the outer surface of each of the arcuate members extending in a vertical direction when the device is in place, the ends of each of the legs extending in opposite directions beyond the area of engagement with the respective arcuate members. A short horizontal leg extends from the upper leg of each of the long legs terminating against the outer periphery of the respective arcuate members to form a generally triangular opening between each bracket and the respective arcuate member. A generally U-shaped flange is provided at the bottom of each long leg extending outwardly from each arcuate band for supporting the bottom of an accessory. A flange extends upwardly from the short leg in a direction away from the generally triangular opening and has a hole therein with a slot between the hole and the short leg. There is also an opening in the short leg between the flange and the long leg. A bracket having a straight arm terminating at one end in a U-shaped portion and having an opening in the arm is positionable with the end of the arm through the slot and the opening in the bracket aligned with the opening in the short leg. An eye bolt having a threaded end extends through the opening in the bracket and the opening in the short leg and is threadably received in a threaded nut attached to the short leg below the opening therein so that the opening in the eye bolt can be aligned with the opening in the flange for receiving lock means for holding the bracket in position so that the accessory cannot be removed without removing the lock means. In addition, a pair of tubular members may be provided, one tubular member being mounted in each of the triangular portions between the respective support brackets and the respective arcuate means for attachment of other accessories.

The device just described provides a support for accessories on a recreational vehicle which is of relatively simple construction and yet is highly efficient in operation and is pleasing in appearance, in addition to being very functional.

Additional advantages of this invention will become apparent from the description which follows, taken in conjunction with the accompanying drawings.

BRIEF DESCRIPTION OF THE DRAWINGS

FIG. 1 is a perspective view of a recreational vehicle with the tire mounted support device of this invention shown in position on a spare tire mounted exteriorly of the vehicle;

FIG. 2 is an enlarged exploded view of the tire mounted support device of FIG. 1 showing the relative position of each of the elements thereof;

FIG. 3 is a rear elevation showing the device in position on a tire; and

FIG. 4 is an enlarged fragmentary view showing the manner in which an accessory is securely fastened to the support device.

DESCRIPTION OF THE PREFERRED EMBODIMENT

In accordance with this invention, a tire mounted support device D is mounted on a vehicle, such as a recreational vehicle V as shown in FIGS. 1 and 3. Conveniently, the device includes a pair of arcuate or generally elongate semicircular members M and M' which extend around the periphery or circumference of a tire 2, as best seen in FIG. 3.

Conveniently, the arcuate members are adjustable so as to accommodate different sized vehicle tires. In this regard, arcuate member M includes a band 4 having a series of slots 6 spaced from the first end thereof as shown in FIG. 2 and terminates at this end with a downturned flange 8 adapted to extend through one of a series of slots 10 in band 12 of arcuate member M'. The first end of band 12 terminates in an upturned flange 14 which is received in one of slots 6 of band 4. Thus, it is apparent that the overlapping relationship between bands 4 and 12 can be adjusted so that the second or lower ends of the bands are spaced a sufficient distance apart so as to be drawn together around the periphery of the tire in frictional or squeezing relationship to hold support device D securely on the tire so that it may carry one or more vehicle accessories.

The lower end of strap 4 is provided with a series of holes 16 adapted to receive bolt 18 which has a right angle bend in it with a head 20 which is positionable between the inner surface of strap 4 and the outer surface of the tire. The bolt also has a threaded end 22 which is extendible through an opening 24 in downturned flange 26 on the lower or second end on band 12. A nut 28 is threadably received on the end of bolt 22 for drawing the bands toward each other so that they fit snugly around the tire to prevent sliding movement of the support device on the tire.

On the side of each band is mounted a vertical planar member or leg 30 which is wider at the bottom than at the top and is connected intermediate its ends, as by welding, to bands 4 and 12, respectively, as shown. The lower end of each leg terminates in a generally U-shaped flange 32 for supporting the bottom of an article 36, such as a gasoline can, whose lower peripheral edge fits over the flange 32, as best seen in FIG. 4.

The upper end of each leg 30 terminates in an inwardly directed short leg 36 which terminates against the respective bands 4 and 6 to form a generally triangular opening therebetween. A flange 38 extends upwardly from leg 36 as shown. Between this flange and leg 30 is an opening or hole 40 for a purpose to be described.

Flange 38 is provided with a hole 42 and a slot 44 between the hole 42 and short leg 36.

A bracket B which has a straight arm terminating at one end, a U-shaped portion 48, and has an opening or hole 50. The end of arm 46 is slidable through slot 44 of flange 38 so that hole 50 can be aligned with hole 40 in short leg 36 whereupon an eye bolt 52 which has a threaded end 54 can be passed through hole 50 in the bracket and hole 40 in short leg 36 to be threadably received in a nut 56 attached, as by welding, to the bottom of short leg 36, as best seen in FIG. 4. Conveniently, the U-shaped portion 48 of bracket B can support the upper end of article 44, such as handle 58, as seen in FIG. 4.

Advantageously, the U-shaped link 60 of padlock 62 can be passed through hole 42 in flange 38 and the hole of eye bolt 52 for locking the article 34 on support device D.

In addition, a short tubular member 64 is provided in the triangular space between short leg 36 and bands 4 and 12 respectively, as shown, which tubes are adapted to receive pins or other accessory holders for supporting additional accessories.

From the foregoing, the advantages of this invention are readily apparent. A support device for mounting on the exteriorly mounted spare tire of a recreational vehicle has been provided which is of simple, yet efficient construction. The device conveniently clamps around the periphery of the tire and can be adjusted to various tire sizes and drawn into tight squeezing engagement therewith to hold the device on the tire so that it does not slip. The device is provided with mounting means such as brackets for supporting one or more vehicle accessories.

The invention has been described in detail with particular reference to preferred embodiments thereof, but it will be understood that variations and modifications can be effected within the spirit and scope of the invention.

What is claimed is:

1. A support device for a vehicle accessory which is attachable to the tread of a spare tire mounted on the exterior of a vehicle, said device comprising:

a circular member including a pair of generally elongate semicircular bands each having a first and second end and an inner surface;

a series of slots spaced along each of said bands from said first end thereof;

a flange extending substantially at right angles from said first end of each of said bands engageable with selected ones of said slots in the other of said bands thereby interconnecting said first ends of said bands;

a series of holes spaced longitudinally along one of said bands from said second end thereof;

a flange extending substantially at right angles from said second end of the other of said bands and having a hold therethrough;

a bolt having a right angle bend adjacent one end, said end having a flat head thereon and the other end of said bolt being threaded, said bolt being positionable through one of said series of holes with said flat head lying against the inside surface of said second end and the other end extending through the hole in said flange on said second end of said other band, said bolt having a nut on said threaded end to apply tension to said bands and thereby draw said second ends of said bands towards each other to hold the inner surfaces of said bands in gripping engagement with the circumference of the tire; and bracket means attached to said circular member for attaching the vehicle accessory.

2. A device as claimed in claim 1, wherein said bracket means includes:

two brackets, one supported from each side of said circular member and having means at their upper and lower ends of fixedly retaining the accessory to be supported.

3. A device, as claimed in claim 2, wherein each of said brackets includes:

a long planar leg attached to the outer surface of said circular member and extending in a vertical direction when said device is in place, the ends of said leg extending in opposite directions beyond the area of engagement with said circular member;

a short horizontal leg extending from the upper end of said long leg and terminating against the outer periphery of said circular member to form a generally triangular opening between said bracket and said circular member and including means for engaging the upper end of an article to be supported; and a generally U-shaped flange at the bottom of said long leg extending outwardly from said circular member for supporting the bottom of the accessory.

4. A device, as claimed in claim 3, wherein said upper article supporting means includes:

a flange extending from said short leg in a direction away from said generally triangular opening and having a hole therein with a slot between said hole and said short leg;

an opening in said short leg between said flange and said long leg;

a bracket having a straight arm terminating at one end in a U-shaped portion and having an opening in said arm, said bracket being positionable with the end of said arm through said slot and said opening in said bracket aligned with said opening in said short leg;

an eye bolt having a threaded end, said end being extendable through said opening in said bracket and said opening in said short leg;

a threaded nut attached to said short leg below said opening therein for threadably receiving said end of said eye bolt so that the opening in said eye bolt is aligned with the hole in said flange for receiving lock means for holding said bracket in position so that the accessory cannot be removed without removing said lock means.

5. A device, as claimed in claim 3, further including a pair of tubular members, one of said members being mounted in each of said triangular portions between said support bracket and said circular member for attachment of other accessories.

6. A support device for a vehicle accessory which is attachable to the tread of a spare tire mounted on the exterior of a vehicle; said device comprising:

a pair of arcuate bands extendible around the periphery of a spare tire mounted on the exterior of a vehicle each band having first and second ends and an inner surface, said first ends of said bands being interconnected in overlapping position and said second end of said bands being spaced from each other;

a series of slots spaced along each of said bands from said first end thereof;

a flange extending substantially at right angles from said first end of each of said bands engageable with selected ones of said slots in the other of said bands;

a series of holes spaced longitudinally along one of said bands from said second end thereof;

a flange extending substantially at right angles from said second end of the other of said bands and having a hole therethrough;

a bolt having a right angle bend adjacent one end, said end having a flat head thereon and the other end of said bolt being threaded, said bolt positionable through one of said series of holes with said flat head lying against the inside surface of said second end and the other end extending through the hole in said flange on said second end on said other band said bolt having a nut on said threaded end to apply tension to said bands;

a long planar leg attached to the outer surface of each of said arcuate members and extending in a vertical direction when said device is in place, the ends of each of said legs extending in opposite directions beyond the area of engagement with said respective arcuate members;

a short horizontal leg extending from the upper end of each of said long legs and terminating against the outer periphery of said respective arcuate member to form a generally triangular opening between each said bracket and said respective arcuate member;

a generally U-shaped flange at the bottom of each said long leg extending outwardly from each arcuate band for supporting the bottom of an accessory;

a flange extending from said short leg in a direction away from said generally triangular opening and having a hole therein with a slot between said hole and said short leg;

an opening in said short leg between said flange and said long leg;

a bracket having a straight arm terminating at one end in a U-shaped portion and having an opening in said arm, said bracket being positionable with the end of said arm through said slot and said opening in said bracket aligned with said opening in said short leg;

an eye bolt having a threaded end, said end being extendible through said opening in said bracket and said opening insaid short leg;

a threaded nut attached to said short leg below said opening therein for threadably receiving said end of said eye bolt so that the opening in said eye bolt is aligned with the opening in said flange for receiving lock means for holding said bracket in position so that the accessory cannot be removed without removing said lock means; and a pair of tubular member, one of said members being mounted in each of said triangular portions between said respective support bracket and said respective arcuate member for attachment of other accessories.

7. The combination of a support device and a spare tire mounted on the exterior of a vehicle, in which the device is attached to the tread of the tire for supporting a vehicle accessory, said combination comprising:

a generally circular tire mounted on the exterior of a vehicle;

a pair of generally elongate, semicircular bands each having a first and a second end and an inner surface;

means for interconnecting said first ends of said bands in overlapping position;

means for drawing said second ends toward each other to hold said inner surface of said bands in gripping engagement with the circumference of said tire;

a pair of bracket means, one fastened to each of said semi-circular bands for fixedly retaining the accessory to be supported.

8. The combination, as claimed in claim 7, wherein said interconnecting means includes:

a series of slots spaced along each of said bands from said first end thereof;

a flange extending substantially at right angles from said first end of each of said bands engageable with selected ones of said slots in the other of said bands.

* * * * *